United States Patent
Sinur et al.

(10) Patent No.: US 12,504,193 B2
(45) Date of Patent: Dec. 23, 2025

(54) SYSTEM FOR ADJUSTING HUMIDITY LEVELS WITHIN AN ENVIRONMENT

(71) Applicant: Broan-NuTone LLC, Hartford, WI (US)

(72) Inventors: Richard R. Sinur, Hartford, WI (US);
Jason Asmus, Hartford, WI (US);
James D. Bohn, Hartford, WI (US);
Seddik Rougab, Hartford, WI (US);
Ryan Revers, Hartford, WI (US);
Moataz Khalil, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 0 days.

(21) Appl. No.: 18/817,338

(22) PCT Filed: Apr. 25, 2023

(86) PCT No.: PCT/US2023/019693
§ 371 (c)(1),
(2) Date: Aug. 28, 2024

(87) PCT Pub. No.: WO2023/211866
PCT Pub. Date: Nov. 2, 2023

(65) Prior Publication Data
US 2025/0257892 A1  Aug. 14, 2025

Related U.S. Application Data

(60) Provisional application No. 63/335,246, filed on Apr. 27, 2022.

(51) Int. Cl.
*F24F 11/63* (2018.01)
*F24F 3/14* (2006.01)
(Continued)

(52) U.S. Cl.
CPC ............... *F24F 11/63* (2018.01); *F24F 3/14* (2013.01); *F24F 2003/144* (2013.01); *F24F 2110/20* (2018.01); *F24F 2110/52* (2018.01)

(58) Field of Classification Search
CPC ........ F24F 11/63; F24F 3/14; F24F 2003/144; F24F 2110/20; F24F 2110/52;
(Continued)

(56) References Cited

U.S. PATENT DOCUMENTS

2003/0188638 A1* 10/2003 Zhang ............... H01M 8/04164
96/294
2009/0057430 A1* 3/2009 Cherewatti ............. F24F 11/65
236/44 A (Continued)

FOREIGN PATENT DOCUMENTS

WO     2020146315 A1     7/2020

OTHER PUBLICATIONS

Duan, Z., 2011. Investigation of a novel dew point indirect evaporative air conditioning system for buildings (University of Nottingham). (Year: 2011).*

(Continued)

*Primary Examiner* — Alicia M. Choi
(74) *Attorney, Agent, or Firm* — Barnes & Thornburg LLP

(57) ABSTRACT

An indoor air quality system is configured to improve indoor air quality conditions within a local environment of a building. The indoor air quality system operates according to a method that includes obtaining indoor air levels and operating one or more appliances to adjust the indoor air levels. The system includes one or more monitoring devices.

13 Claims, 7 Drawing Sheets

(51) Int. Cl.
*F24F 110/20* (2018.01)
*F24F 110/52* (2018.01)

(58) Field of Classification Search
CPC .... F24F 11/30; F24F 11/0008; F24F 11/0001; Y02B 30/70
See application file for complete search history.

(56) References Cited

U.S. PATENT DOCUMENTS

| | | |
|---|---|---|
| 2009/0222138 A1 | 9/2009 | Boudreau et al. |
| 2015/0032264 A1* | 1/2015 | Emmons .............. F24F 11/0001 700/276 |
| 2015/0204558 A1* | 7/2015 | Sartain ..................... F24F 11/58 700/278 |
| 2015/0345819 A1 | 12/2015 | Ostrovsky et al. |
| 2016/0131376 A1* | 5/2016 | Yoon ........................ F24F 11/70 62/86 |
| 2019/0338974 A1 | 11/2019 | Turney et al. |
| 2019/0360717 A1* | 11/2019 | Chae ........................ F24F 11/63 |
| 2020/0011559 A1* | 1/2020 | Wan ......................... F24F 11/00 |
| 2021/0102722 A1 | 4/2021 | Nabi et al. |
| 2021/0239339 A1 | 8/2021 | Morgan |
| 2022/0010996 A1 | 1/2022 | Carrieri |
| 2022/0404056 A1 | 12/2022 | Bloemer |
| 2023/0332788 A1* | 10/2023 | Ajax ....................... F24F 13/28 |

OTHER PUBLICATIONS

Kumari, S. and Jain, M.K., 2018. A critical review on air quality index. Environmental Pollution: Select Proceedings of ICWEES—2016, pp. 87-102. (Year: 2018).*

Office Action for U.S. Appl. No. 18/179,647 dated Sep. 4, 2025 (22 pages).

* cited by examiner

SYSTEM FOR ADJUSTING HUMIDITY LEVELS WITHIN AN ENVIRONMENT

PRIORITY CLAIM

This application claims priority under 35 U.S.C. § 119(e) to PCT Application Serial No. US23/19693, filed Apr. 23, 2023 and U.S. Provisional Application Ser. No. 63/335,246 filed Apr. 27, 2022, which is expressly incorporated by reference herein.

BACKGROUND

The present disclosure relates to air quality, and particularly to systems for improving air quality. More particularly, the present disclosure relates to systems for improving indoor air quality.

SUMMARY

According to the present disclosure, a method of dehumidifying air within a local environment of a structure includes positioning a plurality of monitoring devices in the local environment of the structure. Each monitoring device of the plurality of monitoring devices being located in a corresponding room of the structure. The method may further include determining a room humidity level with each monitoring device in each room the structure where the monitoring devices are located. The method may further include calculating a total humidity level of the local environment based on each of the room humidity levels. The method may further include activating a dehumidification device to remove moisture from the air within the local environment of the structure when the total humidity level of the local environment is above a predetermined threshold.

According to another aspect of the present disclosure, a method of improving humidity levels within a local environment of a structure includes positioning a plurality of monitoring devices in the local environment of the structure. Each monitoring device of the plurality of monitoring devices being located in a corresponding room of the structure. The method may further include determining a room humidity level with each monitoring device in each room the structure where the monitoring devices are located. The method may further include calculating a total humidity level of the local environment based on each of the room humidity levels. The method may further include determining whether to activate or deactivate a dehumidification device to remove moisture from the air within the local environment of the structure based on the total humidity level of the local environment.

In illustrative embodiments, an air quality system for improving indoor air quality levels within a local environment of a building includes a plurality of monitoring devices with at least one monitoring device being positioned in separate rooms of the building. The system may further include a plurality of appliances including an exhaust fan, a supply fan, and a dehumidification unit. The method may further include a control system in communication with the plurality of monitoring devices and the plurality of appliances and configured to operate one or more of the appliances in response to signals from the plurality of monitoring devices. The control system is configured to: obtain outdoor air quality index data from an external data source, determine a room humidity level with each monitoring device in each room the structure where the monitoring devices are located, calculate a total humidity level of the local environment based on each of the room humidity levels, and determine whether to activate or deactivate a dehumidification device to remove moisture from the air within the local environment of the structure based on the total humidity level of the local environment and the outdoor air quality index data.

In some embodiments, the control system is configured to obtain an outdoor dew point from the outdoor air quality index data and calculate an indoor dew point from the total humidity level. In some embodiments, if the outdoor dew point is greater than the indoor dew point and the indoor dew point is greater than an acceptable, predetermined threshold, the control system is configured to activate the exhaust and supply fans together with the dehumidification device to remove indoor pollutants and decrease humidity within the indoor environment at the same time.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
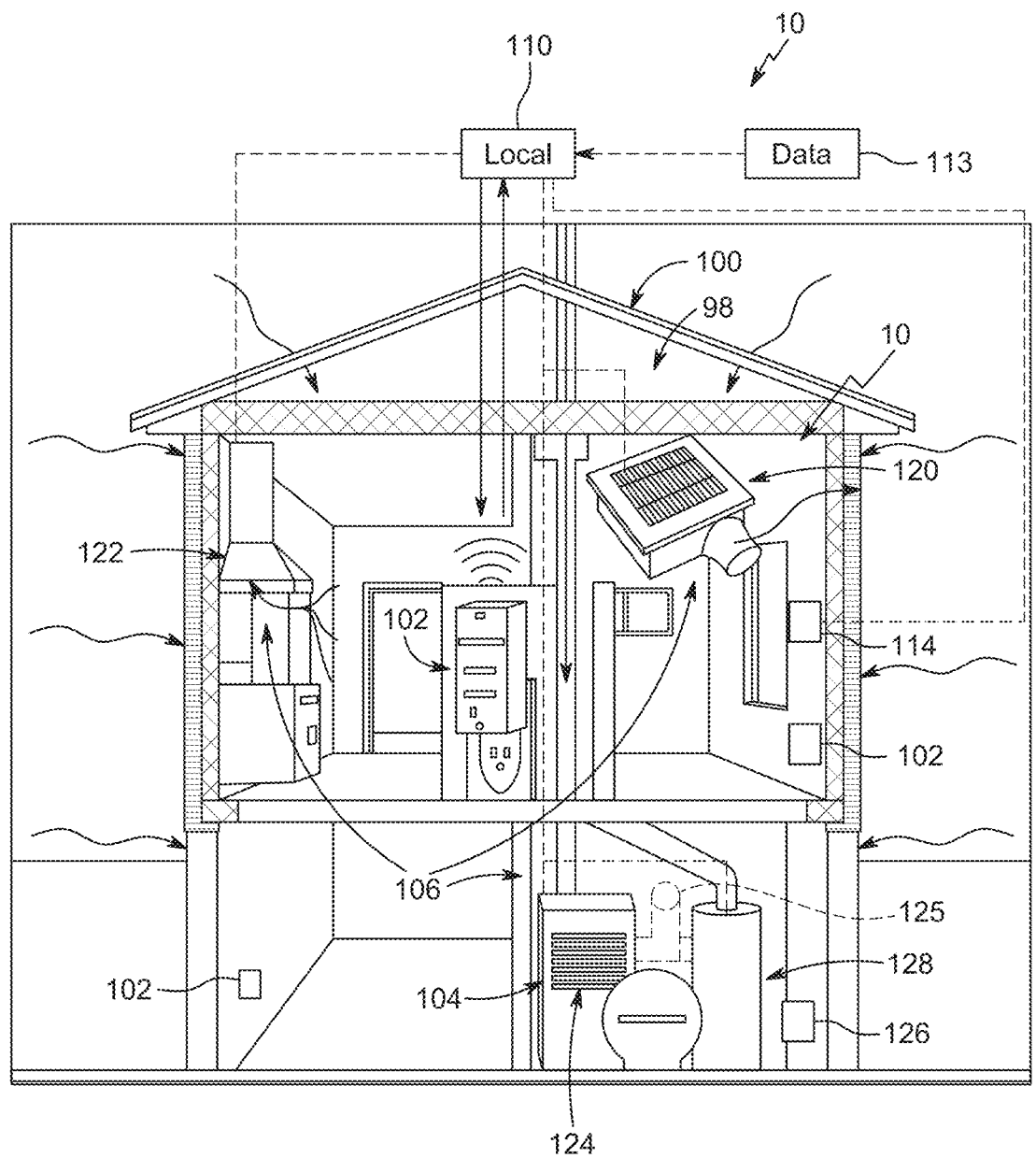
FIG. 1 is a side elevation view of a building with portions removed to show that the building includes an indoor air quality system.

An indoor air quality (IAQ) system 10 for a building 100 includes a plurality of monitoring devices 102 and a plurality of air quality appliances or devices 106 connected to each of the monitoring devices 102 as shown in FIG. 1. The monitoring devices 102 are configured to sense and record IAQ data from an indoor environment 98 of the structure 100. The IAQ data includes temperature, humidity and/or pollutant levels, such as TVOC, $CO_2$, PM2.5. The IAQ data may be recorded on a local server/database 110 (also called a control system) included in the IAQ system 10. The plurality of connected appliances 106 are operated based on the sensed IAQ data. In particular, the plurality of appliances 106 includes a dehumidification device 128 that is configured to adjust the humidity levels within the indoor environment 98 of the structure 100 in response to sensed humidity levels being outside a predetermined threshold or range.

The IAQ system 10 is also capable of obtaining outdoor air quality index (AQI) data external to the structure (e.g. weather, smoke, fog, temperature, humidity, dew point, and/or pollutant levels, such as TVOC, $CO_2$, PM2.5) from various locations surrounding the structure 100 to compare with the IAQ data obtained within the structure 100. The AQI data may be obtained from an external data source 113. The connected appliances 106, including the dehumidification device 128, are then operated in response to the sensed IAQ data from the monitoring devices 102 and the AQI data from the external data source 113. In some embodiments, the AQI data is calculated by and obtained from a government entity (e.g. the United States or Canada) such as the US National Oceanic and Atmospheric Administration (NOAA).

The local server/database 110 may be located in or around the structure 100 or may be located in a remote location to the structure 100. The local server/database 110 may: i) analyze the IAQ data, ii) determine if all levels contained within IAQ data are within predefined threshold ranges, and iii) may recommend that the IAQ system 10 take certain steps (e.g., turn ON/OFF various appliances) to bring certain levels of the components within the predetermined threshold range or adjust the levels of the components based on the AQI data from the AQI data source 113. The IAQ system 10 can carry out these steps by controlling the operational mode (e.g., ON/OFF and/or the speed of the fan) of one or more appliances 106 contained within the operating environment. Once the IAQ system 10 has determined that the levels contained within the IAQ data are within predetermined threshold ranges that counteract the anticipated AQI data, the IAQ system 10 may instruct the appliances 106 to turn OFF or take further action in response to the AQI data. It should be understood in certain embodiments that some of the devices set forth above may be omitted. Additionally, in other embodiments, the IAQ system 10 may include additional devices and/or components. Reference is hereby made to U.S. patent application Ser. No. 17/298,362, filed May 28, 2021, and U.S. patent application Ser. No. 17/417,471, filed Jun. 23, 2021, each of which is incorporated by reference here in in their entirety.

The monitoring device 102 includes at least one sensor, which it uses to collect data about the local environment 98 of the structure 100. Some or all of this IAQ data is then sent to the local server/database 110, which processes and stores this data. If the local server/database 110 determines that one level contained within the IAQ data is out of the predetermined threshold range, then the IAQ system 10 may be configured to operate one or more of the appliances 106 to adjust the level. If the local server/database 110 determines that levels contained in the AQI data are outside of the predetermined threshold ranges, the IAQ system 10 may further operate one or more of the appliances 106 to bring indoor air levels within certain ranges in response to the AQI data. For example, if the AQI data indicates that outdoor levels will be in an unacceptable range at 1 PM, the IAQ system 10 may ventilate the local environment 98 of the structure 100 prior to 1 PM. In some embodiments, the IAQ system 10 may exceed a ventilation threshold to over-ventilate the structure 100 prior to 1 PM to minimize indoor air contaminants levels and to anticipate the ventilation system shutdown at 1 PM and the associated indoor air contaminants rise.

In one embodiment, the monitoring device 102 is or includes a plurality of sensors for monitoring the environment 98 as depicted in FIG. 1. In some embodiments, each sensor is the same and is configured to measure a plurality of different levels of pollutants and other characteristics of the air in the local environment 98 of the structure 100. In some embodiments, one such sensor is located in each room of the structure 100 to provide data on air quality levels within each respective room. The data from each sensor are output to and collected by the local server/database 110. The levels can be averaged among each room to determine an overall level for each pollutant and/or characteristic of the air in the structure 100 as a whole. User preferences or inputs may be made to the IAQ system 10 to manually weight certain contaminant levels to cause the IAQ system 10 to address that contaminant(s) ahead of others. Certain contaminants may be weighted automatically based on health hazards. In some embodiments, dimensions of each room are stored in local server/database 110 and a weight is given to the air quality levels determined in each room based on the total volume of air in each respective room of the structure 100. In other embodiments, each sensor is different from one another and dedicated to measuring at least one specific pollutant. The monitoring device 102 can include one or more separate infrared (IR) sensors, one or more separate air pollutant sensors, one or more motion sensors, and one or more separate humidity/temperature sensors, with each sensor being positioned in different parts or rooms of the structure 100.

Applying weighted humidity values can optimize operation of the dehumidification device 128 to account for short termed and/or localized high-humidity events such as showering or cooking. The local database/server 110 may weight the humidity valves sensed by the monitoring device 102 in rooms of the building 100 such as bathrooms and kitchens to account for these short and/or localized high-humidity events. In one example, structure 100 includes a single bathroom and the volume of air within the bathroom is about 10% of the total volume of the environment 98. Prior to a hot shower event, the humidity in the bathroom is equal to about 50% as sensed by a monitoring device 102 in the bathroom. The shower event lasts 10 minutes and the humidity of the bathroom increases to 90% during the shower event. In this situation, the local database/server 110 can determine that a short, localized, high-humidity event has occurred in the bathroom by determining the humidity values of every other room where there is a monitoring device 102 present. In such a situation, the high humidity value sensed in the bathroom could increase the total humidity value of the structure above a threshold if all rooms were weighted equally. Under normal circumstances the local database/server 110 would activate the dehumidification device to dehumidify the entire environment 98. However, in the illustrative embodiment, the local database/server 110 is configured to recognize when a short, localized, high-humidity event has occurred in the bathroom and can ignore the humidity value received from that room when calculating the total humidity value of the environment 98. Thus, the dehumidification unit 128 is not activated during some short, localized, high-humidity events even if the total humidity value of the environment 98 calculated by local database/server 110 is above the threshold. More than one room in the building 100 can have a high-humidity event at the same time and the adjustment to the calculation of the total humidity value within environment 98 can be made taking all high-humidity events into account. In some embodiments, the local server 110 can determine whether or not an exhaust fan associated with the room in which the event has occurred is activated or not. The system 10 may activate the exhaust fan and/or the dehumidification unit 128 if it is determined that the shower occupant has forgotten to activate the exhaust fan.

In one example, the local database/server 110 is configured to monitor a rate of change of the humidity level sensed by the monitoring device 102 in each room or in selected rooms such as bathrooms and kitchens. The local/database server 110 can determine when there is a short, localized, high-humidity event using the rate of change of the humidity level. In some embodiments, the rate of change that indicates a short, localized, high-humidity event is a humidity level increase of at least 1% per minute. In some embodiments, the rate of change that indicates a short, localized, high-humidity event is a humidity level increase of at least 2% per minute. In some embodiments, the rate of change that indicates a short, localized, high-humidity event is a humidity level increase of at least 3% per minute. In some embodiments, the rate of change that indicates a short, localized, high-humidity event is a humidity level increase of at least 4% per minute. In some embodiments, the rate of change that indicates a short, localized, high-humidity event is a humidity level increase of at least 5% per minute. In some embodiments, the rate of change that indicates a short, localized, high-humidity event is a humidity level increase of at least 6% per minute. In some embodiments, the rate of change that indicates a short, localized, high-humidity event is a humidity level increase of at least 7% per minute. In some embodiments, the rate of change that indicates a short, localized, high-humidity event is a humidity level increase of at least 8% per minute. In some embodiments, the rate of change that indicates a short, localized, high-humidity event is a humidity level increase of at least 9% per minute. In some embodiments, the rate of change that indicates a short, localized, high-humidity event is a humidity level increase of at least 10% per minute. In another example, humidity readings in a bathroom can be routinely ignored due to the unreliability of readings introduced by showering.

The AQI data source 113 may include distributed external sensors, weather pattern data, historical air quality databases, air quality prediction databases, and other information about the air that is exterior to the structure 100. For example, one external sensor may be located in the outside air supply duct to measure contaminant levels being brought into the local environment 98. The data source 113 may include a prediction table that is based on information derived from current and historical data collected from: i) exterior local/regional/national sensors (e.g. dew point, temperature, air pollutants), ii) sensors installed in other structures, iii) weather information, iv) electricity costs, and v) other similar types of data. The data contained within the data source 113 can be accessed by a combination of the national database 112 and the local server/database 110. This data can be utilized to help make predictions when levels of the components of both indoor air and outdoor air will be deemed to be out of predetermined threshold ranges and facilitate a determination of which corrective measures to take (e.g. operate one or more exhaust fans to exhaust indoor air and/or operate one or more supply fans to bring in outdoor air (also known as fresh air)). The data source 113 can be utilized to maximize the quality of the air contained within the structure 100 based on predictions about the exterior environmental conditions. In some situations, alerts from a National/Regional weather surveillance service may be input and stored in the local server/database 110 and utilized when operating the IAQ system 10.

A user may be required to enter their zip code into the IAQ system 10. The IAQ system 10 may use this zip code to determine the closest AQI weather station and allow the user to change the default. The zip code may also be used to select the default (AQI vs. Humidity).

The IAQ system 10 may consider climate zones and determine by climate zone what will be the default condition. For instance, in the southern areas of the United States the default preference may be humidity while in western United States areas the default preference may be AQI. The user may have the ability to change the default and their preference if so desired.

If cost are associated with obtaining AQI data from data source 113, the IAQ system 10 may query all existing systems in the same or similar zip code. In this case, only one IAQ system 10 within that zip code may obtain the AQI data and the other IAQ systems 10 may obtain the AQI data from the first IAQ system 10, thus minimizing the number of calls and associated costs.

The one or more appliances 106 used with the IAQ system 10 can include any heating, ventilation, and air conditioning device or any device that controls/changes the air within local environment 98 (i.e. air purifiers, heaters, swamp coolers, humidifiers, etc.). In the illustrative embodiment, the appliances 106 used with the IAQ system 10 include one or more exhaust fans (i.e. bathroom fan(s) 120 or range hood(s) 122), a coupled or decoupled supply fan 124 (which can, optionally, be connected to or part of a central unit 104), an energy/heat recovery device 126, the dehumidification device 128, an air purifier 130, and/or a humidification device 132 as shown in FIG. 1. The one or more exhaust fans 120 are configured to remove air from the local environment to outside the structure 100 for ventilation purposes. The supply fan 124 is part of a fresh air system with at least one port 125 open to the ambient environment outside the structure 100, allowing the supply 124 to draw outdoor air into the indoor operating environment 98 of the building structure 100. The supply fan 124 is configured to circulate fresh air throughout the structure 100 via a plurality of ducts and vents/dampers. The port may include a damper (not depicted) to selectively open when fresh air is desired to be drawn into the local environment as explained in greater detail below. In an alternative embodiment, the supply fan 124 is not connected to a central unit 104, but instead simply draws outdoor air into the particular location of the building structure 100 in which the fresh air system is located. The supply fan 124 may also include an outlet port for exhaust purposes. The energy/heat recovery device 126 is coupled to one or more air inlet/outlet flows and is configured to exchange heat and/or energy between an intake airflow flowing into the structure 100 and an exhaust airflow flowing out of the structure 100 to minimize energy/heat loses as a result of operating the IAQ system 10. The dehumidification device 128 is configured to decrease relative humidity within the local environment 98. The humidification device 132 is configured to increase the relative humidity within the local environment 98. The air purification device 130 is configured to decrease the particles matter content of the air and/or the gaseous pollutants content of the air within the local environment 98. Each of the devices is activated or deactivated in response to the sensed indoor air condition levels from the monitoring devices 102 and the outdoor AQI data from the AQI data source 113, as explained in each of the scenarios described below, in order to optimize the IAQ of environment 98.

Figure 2A:
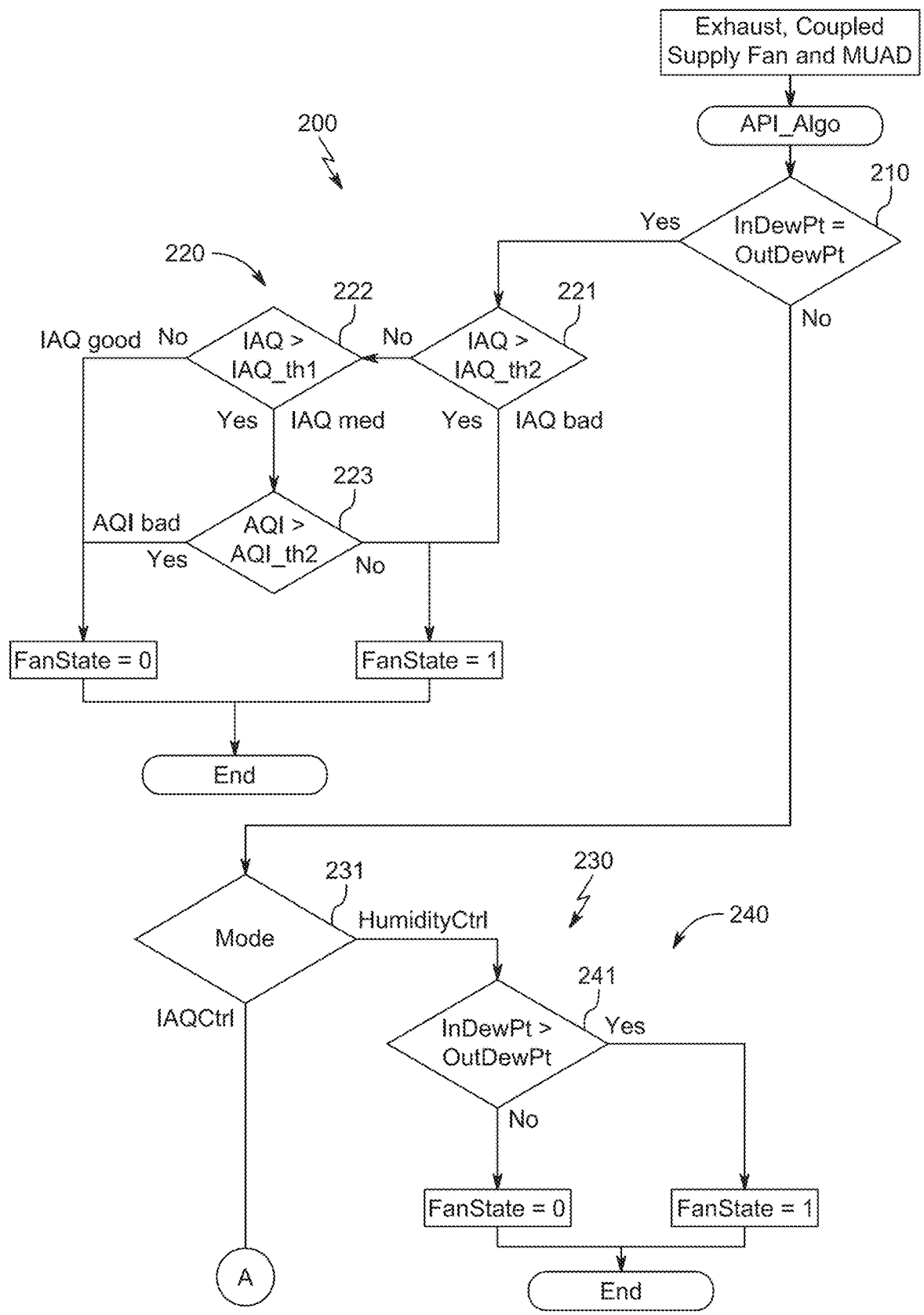
FIG. 2A is a portion of a flow chart describing operation of the indoor air quality system of FIG. 1.
Figure 2B:
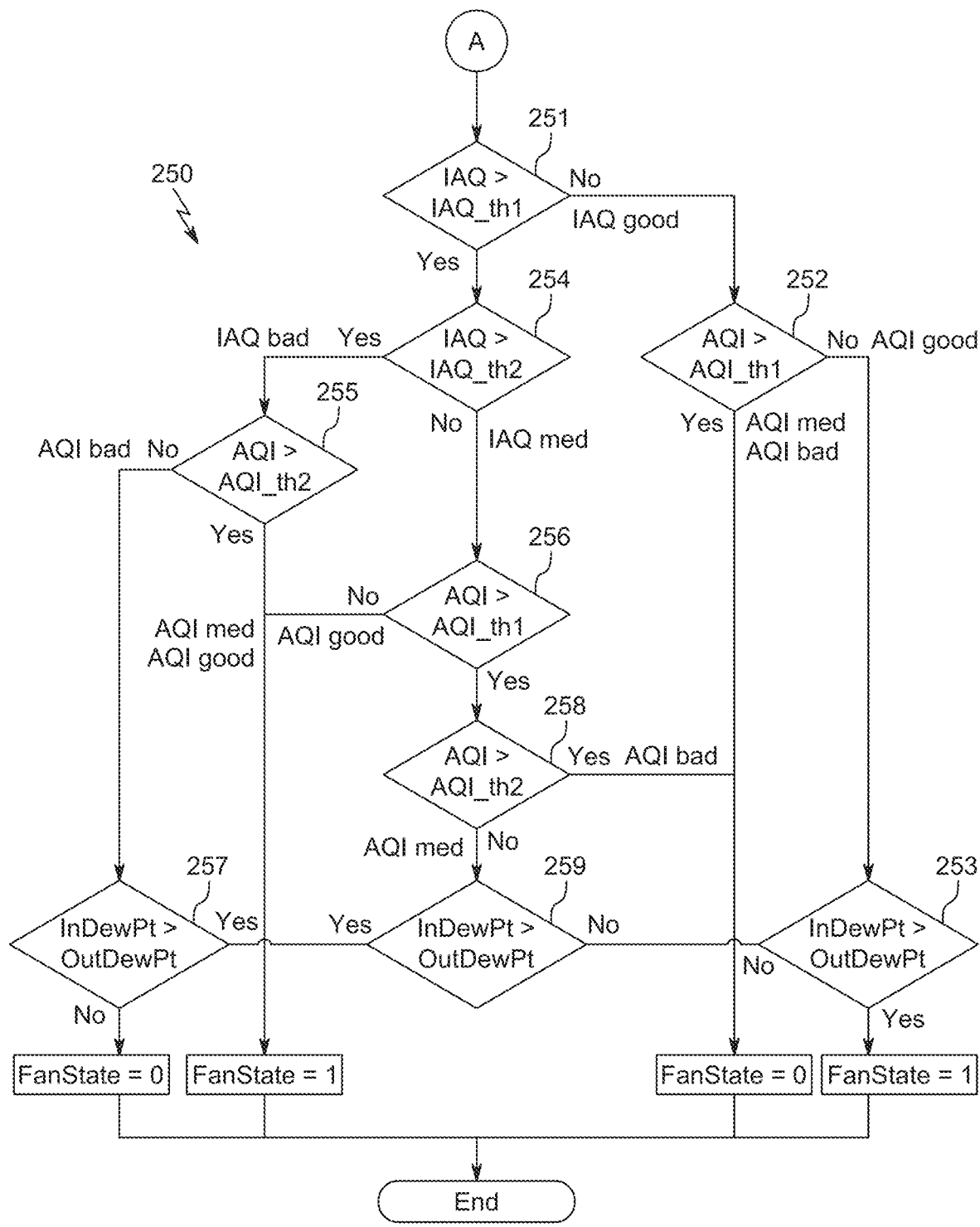
FIG. 2B is another flow chart describing additional operations of the indoor air quality system of FIG. 1.

A first schematic flow chart 200 describing the operation of the IAQ system 10 is shown in FIG. 2. In the flow chart of FIG. 2, the IAQ system 10 includes one or more exhaust fans 120/122 and a coupled supply fan 124 with a make-up air damper (MUAD). "Make-up air" is outdoor air brought into the building structure 100 to replace exhausted air and maintain an appropriate air pressure balance between the indoor and outdoor environments. A first step 210 includes determining whether indoor dew point is equal to outdoor dew point levels. This may be assumed or sensed by the monitoring units 102 and by consulting the data source 113 or data provided by one or more appliances 106.

The following ranges of values will be used to indicate good/medium/bad ranges of values and better/worse values as discussed below:

|  | Indoor Air Quality Level (IAQ) | Outdoor Air Quality Index (AQI) | Humidity |
| --- | --- | --- | --- |
| Good | 0-40 | 0-100 | 40-60% |
| Medium | 41-80 | 101-150 | 20-39% or 61-80% |
| Bad | 81-100 | 151+ | <20% or >80% |

The following ranges will be used to indicate better, worse, and same conditions described below. Better means greater than 10%. Worse means less than 10%. Same means within 10%. In other embodiments, a different range may be used (i.e. 5%, 15%, 20%, etc.).

If indoor dew point levels are equal to outdoor dew point levels, the process 200 proceeds to a first ventilation sub-process 220 where only exhaust and supply fans are operated/activated (fan state=1) to vent the local environment 98 depending on air quality levels of both the local environment and the outdoor environment. At a first step 221, the local database/server 110 determines whether the IAQ data from the monitoring devices 102 is greater than a second IAQ threshold (i.e. a bad IAQ). If the IAQ data from the monitoring devices 102 is greater than the second IAQ threshold, the exhaust and supply fans are activated to ventilate the local environment 98. If the IAQ data from the monitoring devices 102 is not greater than the second IAQ threshold, the process 220 proceeds to step 222 where the local database/server 110 determines whether the IAQ data from the monitoring devices 102 is greater than a first IAQ threshold (i.e. a medium IAQ). If the IAQ data from the monitoring devices 102 is not greater than the first IAQ threshold, the exhaust and supply fans are not operated (i.e. fan state=0). If the IAQ data from the monitoring devices 102 is greater than the first IAQ threshold, the process 220 proceeds to a step 223 where the database/server 110 determines whether the outdoor AQI data is greater than a second AQI threshold (i.e. a bad AQI). If the outdoor AQI data is greater than the second AQI threshold, the exhaust and supply fans are not operated. If the outdoor AQI data is not greater than the second AQI threshold, the exhaust and supply fans are operated. The exhaust and supply fans may be modulated depending on if more or less ventilation or other air conditioning action is needed/desired.

Returning to decision step 210, if the indoor dew point is not equal to the outdoor dew point, the process 200 proceeds to a second ventilation sub-process 230 which considers user preference and humidity when determining when to operate the fans and/or other devices. At a first step 231, the user may provide an input into the system 10 to indicate a preference for humidity control (sub-process 240) or IAQ control (sub-process 250). The dehumidification device 128 can be used in either sub-process 240, 250.

Sub-process 240 includes a decision step 241 where the database/server 110 determines whether the indoor dew point is greater than the outdoor dew point. If the indoor dew point is greater than the outdoor dew point, the exhaust and supply fans are operated to ventilate the local environment 98 to exchange the less humid outdoor air with the more humid indoor air. If the indoor dew point is not greater than the outdoor dew point, the exhaust and supply fans may not be operated.

The dehumidification device 128 may also be operated to remove moisture from the indoor air. For example, if the indoor humidity level is greater than a predetermined threshold, the dehumidification device 128 may be is operated to reduce the humidity level within the indoor environment 98. This operation can be performed with or without regard to the outdoor dew point obtained by the external data source 113. For example, even if the outdoor dew point is greater than the indoor dew point and the indoor dew point is greater than an acceptable threshold, the exhaust and supply fans may be operated together with the dehumidification device 128 to remove indoor pollutants and decrease humidity within the indoor environment at the same time. In such an instance, indoor pollutant levels are above a threshold pollutant level, indoor humidity is above a threshold humidity level, and outdoor dew point is greater than indoor dew point. Other systems without a dehumidification device 128 may determine that the exhaust and supply fans should not be activated in this situation since this would result in high-humidity outdoor air being brought into the indoor environment 98 which itself already has a humidity above an acceptable level. However, in the illustrative embodiment, the IAQ system 10 is configured to activate the exhaust and supply fans and the dehumidification device to improve pollution levels and humidity levels within the indoor environment at the same time.

The dehumidification device 128 may include its own intake port or may be coupled to the same intake port 125 as the supply fan 124. One or more valves (not shown) may be coupled to the ducts interconnecting the intake port 125 and the supply fan 124 and the dehumidification device 128 to control the flow of air therebetween as shown in FIG. 1. The valve(s) can be controlled by the local database/server 110 in response to sensed IAQ data and external AQI data.

Sub-process 250 includes a step 251 where the local database/server 110 determines whether the IAQ data from the monitoring devices 102 is greater than the first IAQ threshold. If the IAQ data from the monitoring devices 102 is not greater than the first IAQ threshold, the sub-process proceeds to a step 252 where the local database/server 110 determines whether the AQI data is greater than a first AQI threshold (i.e. a medium/bad AQI value). If the AQI data is greater than the first AQI threshold, the exhaust and supply fans are not operated. If the AQI data is not greater than the first AQI threshold, the sub-process proceeds to a step 253 where the local database/server determines whether indoor dew point is greater than outdoor dew point. If indoor dew point is greater than outdoor dew point, the exhaust and supply fans are operated. The dehumidification device 128 may also be operated if indoor dew point is greater than outdoor dew point. If indoor dew point is not greater than outdoor dew point, the exhaust and supply fans are not operated.

The dehumidification device 128 may also be operated if indoor dew point is less than outdoor dew point while the exhaust and supply fans are operated as described above. Thus, in this situation, IAQ is greater than the first IAQ threshold, AQI is less than the first AQI threshold, indoor dew point is less than outdoor dew point, and the exhaust and supply fans are activated while the dehumidification unit is being operated.

If the IAQ data from the monitoring devices 102 is greater than the first IAQ threshold, the sub-process proceeds to a step 254 where the local database/server 110 determines whether the IAQ data from the monitoring devices 102 is greater than the second IAQ threshold. If the IAQ data from the monitoring devices 102 is greater than the second IAQ threshold, the sub-process 250 proceeds to step 255 where the local database/server 110 determines whether the AQI data is greater than the second AQI threshold. If the IAQ data from the monitoring devices 102 is not greater than the second IAQ threshold, the sub-process 250 proceeds to step 256 where the local database/server 110 determines whether the AQI data is greater than the first AQI threshold.

From step 255, if the AQI data is greater than the second AQI threshold, the exhaust and supply fans are operated. If the AQI data is not greater than the second AQI threshold, the sub-process 250 proceeds to step 257 where the local database/server 110 determines whether indoor dew point is greater than outdoor dew point. If indoor dew point is greater than outdoor dew point, the exhaust and supply fans are operated. If indoor dew point is not greater than outdoor dew point, the exhaust and supply fans are not operated.

From step 256, if the AQI data is not greater than the first AQI threshold, the exhaust and supply fans are operated. If the AQI data is greater than the first AQI threshold, the sub-process 250 proceeds to a step 258 where the local database/server 110 determines whether the AQI data is greater than the second AQI threshold. If the AQI data is greater than the second AQI threshold, the exhaust and supply fans are not operated. If the AQI data is not greater than the second AQI threshold, the sub-process 250 proceeds to step 259 where the local database/server 110 determines whether indoor dew point is greater than outdoor dew point. If indoor dew point is greater than outdoor dew point, the exhaust and supply fans are operated. If indoor dew point is not greater than outdoor dew point, the exhaust and supply fans are not operated.

The dehumidification device 128 may also be operated without regard to the decision at step 259. For example, in one situation, IAQ is greater than the first IAQ threshold, IAQ is less than the second IAQ threshold, AQI is greater than the first AQI threshold, AQI is less than the second AQI threshold, indoor dew point is less than outdoor dew point, and the exhaust and supply fans are activated while the dehumidification device 128 is being operated. In another situation, IAQ is greater than the first IAQ threshold, IAQ is greater than the second IAQ threshold, AQI is less than the second AQI threshold, indoor dew point is less than outdoor dew point, and the exhaust and supply fans are activated while the dehumidification device 128 is being operated.

Figure 3A:
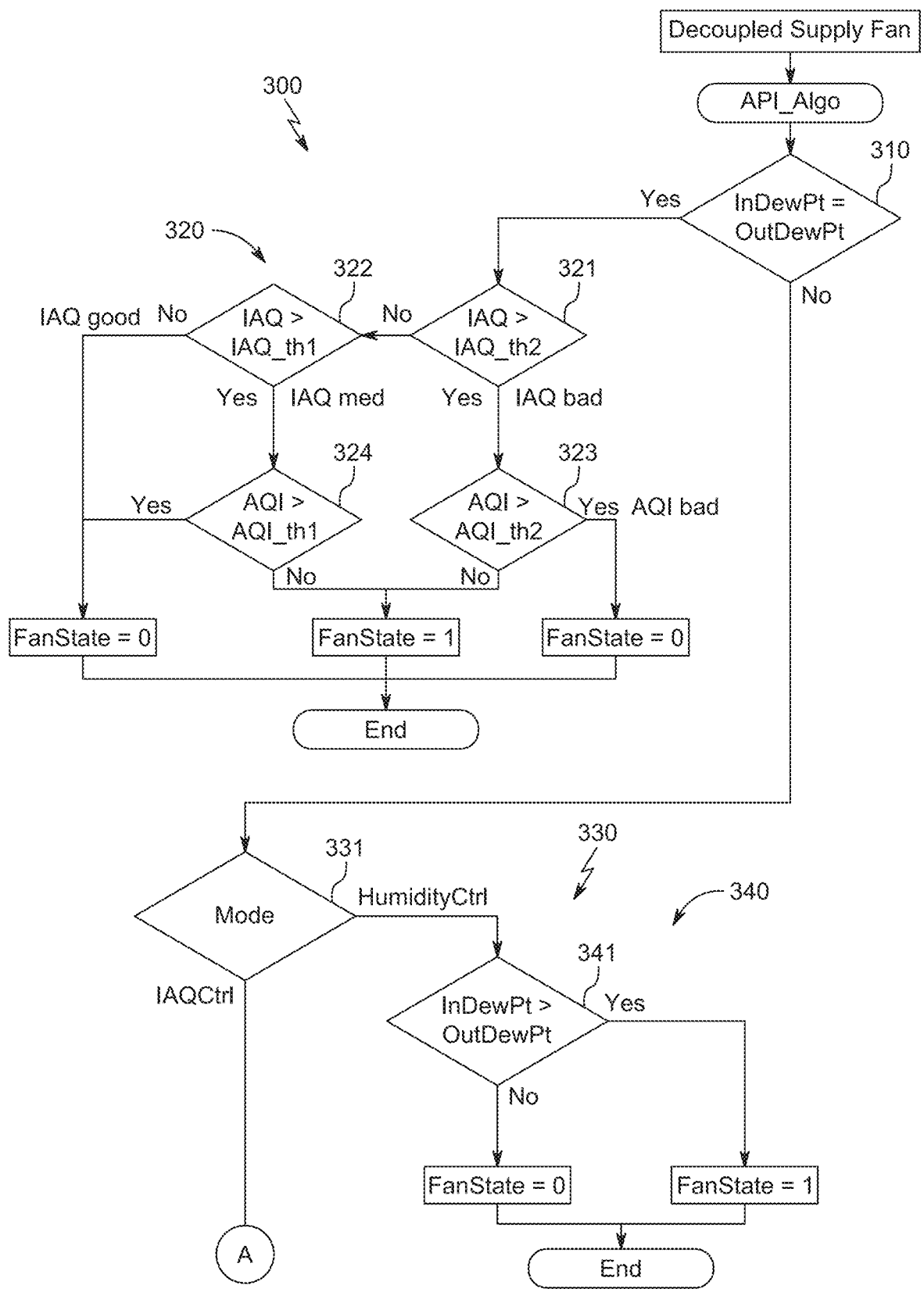
FIG. 3A is a portion of another flow chart describing operation of the indoor air quality system of FIG. 1.
Figure 3B:
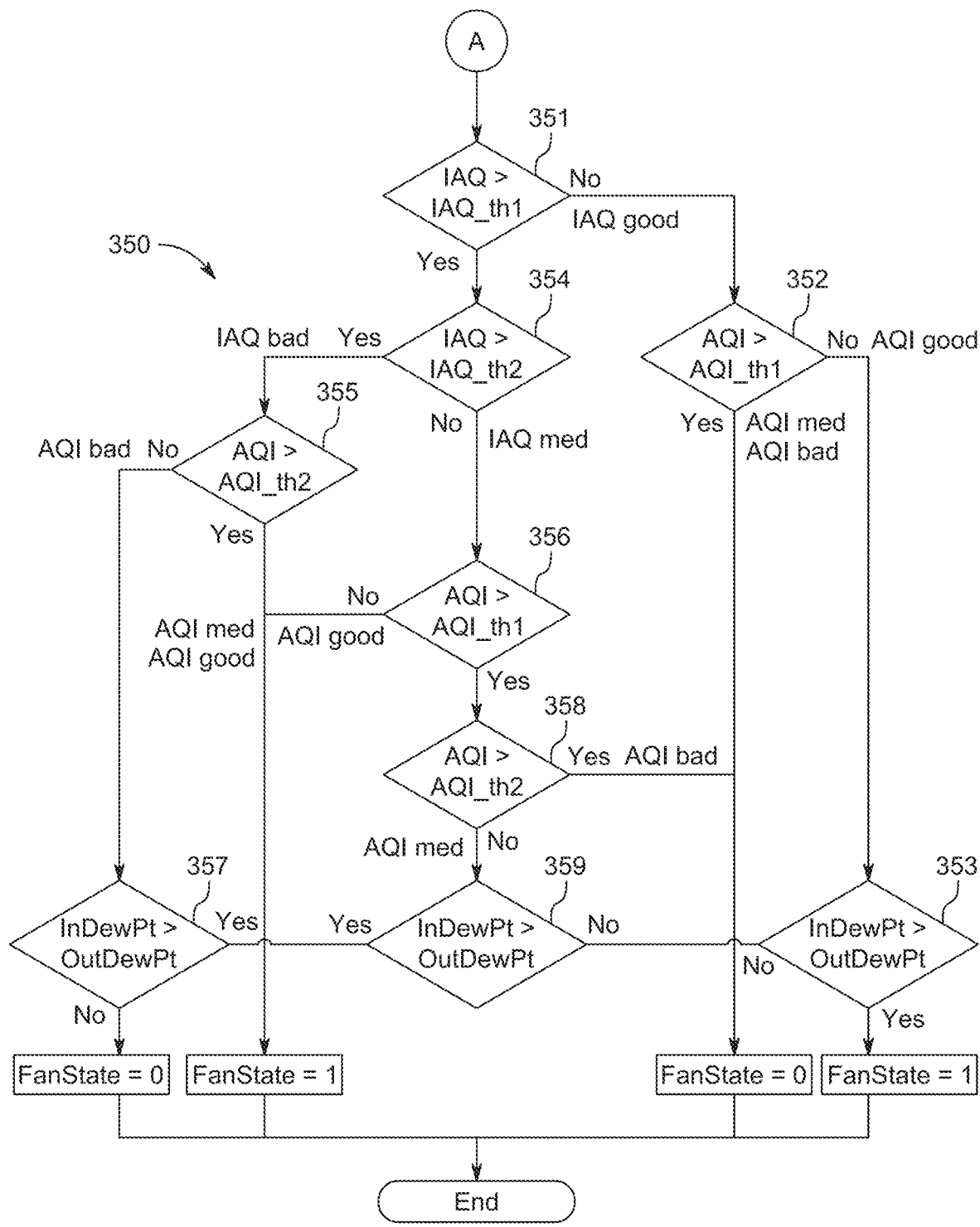
FIG. 3B is another portion of the flow chart of FIG. 3A.

A second schematic flow chart 300 describing the operation of the IAQ system 10 is shown in FIG. 3. In the flow chart of FIG. 3, the IAQ system 10 includes one or more exhaust fans 120/122 and a de-coupled supply fan 124. A first step 310 includes determining whether indoor dew point is equal to outdoor dew point levels. This may be assumed or sensed by the monitoring units 102 and by consulting the data source 113. The same good/medium/bad ranges discussed above apply to process 300. The same ranges for better/worse and same apply to process 300.

If indoor dew point levels are equal to outdoor dew point levels, the process 300 proceeds to a first ventilation sub-process 320 where only exhaust and supply fans are operated (fan state=1) to vent the local environment 98 depending on air quality levels of both the local environment and the outdoor environment. At a first step 321, the local database/server 110 determines whether the IAQ data from the monitoring devices 102 is greater than a second IAQ threshold (i.e. a bad IAQ). If the IAQ data from the monitoring devices 102 is not greater than the second IAQ threshold, the process 320 proceeds to step 322 where the local database/server 110 determines whether the IAQ data from the monitoring devices 102 is greater than a first IAQ threshold (i.e. a medium IAQ). If the IAQ data from the monitoring devices 102 is greater than the second IAQ threshold, the sub-process 320 proceeds to a step 323 where the local database/server 110 determines whether the AQI data is greater than the second AQI threshold.

At step 322, if the IAQ data from the monitoring devices 102 is not greater than the first IAQ threshold, the exhaust and supply fans are not operated (i.e. fan state=0). If the IAQ data from the monitoring devices 102 is greater than the first IAQ threshold, the sub-process 320 proceeds to a step 324 where the local database/server 110 determines if the AQI data is greater than the first AQI threshold. If the AQI data is greater than the first AQI threshold, the exhaust and supply fans are not operated. If the AQI data is not greater than the first AQI threshold, the exhaust and supply fans are operated.

At step 323, if the outdoor AQI data is greater than the second AQI threshold, the exhaust and supply fans are not operated. If the outdoor AQI data is not greater than the second AQI threshold, the exhaust and supply fans are operated.

Returning to decision step 310, if the indoor dew point is not equal to the outdoor dew point, the process 300 proceeds to a second ventilation sub-process 330 which considers user preference and humidity when determining when to operate the fans and/or other devices. At a first step 331, the user may provide an input into the system 10 to indicate a preference for humidity control (sub-process 240) or IAQ control (sub-process 250). Sub-process 340 and sub-process 350 are the same as sub-process 240 and sub-process 250, respectively. Accordingly, the disclosure above is incorporated by reference herein. Similar reference numbers in the 300 series are used to indicate steps common between sub-processes 240, 250 and sub-processes 340, 350.

Figure 4A:
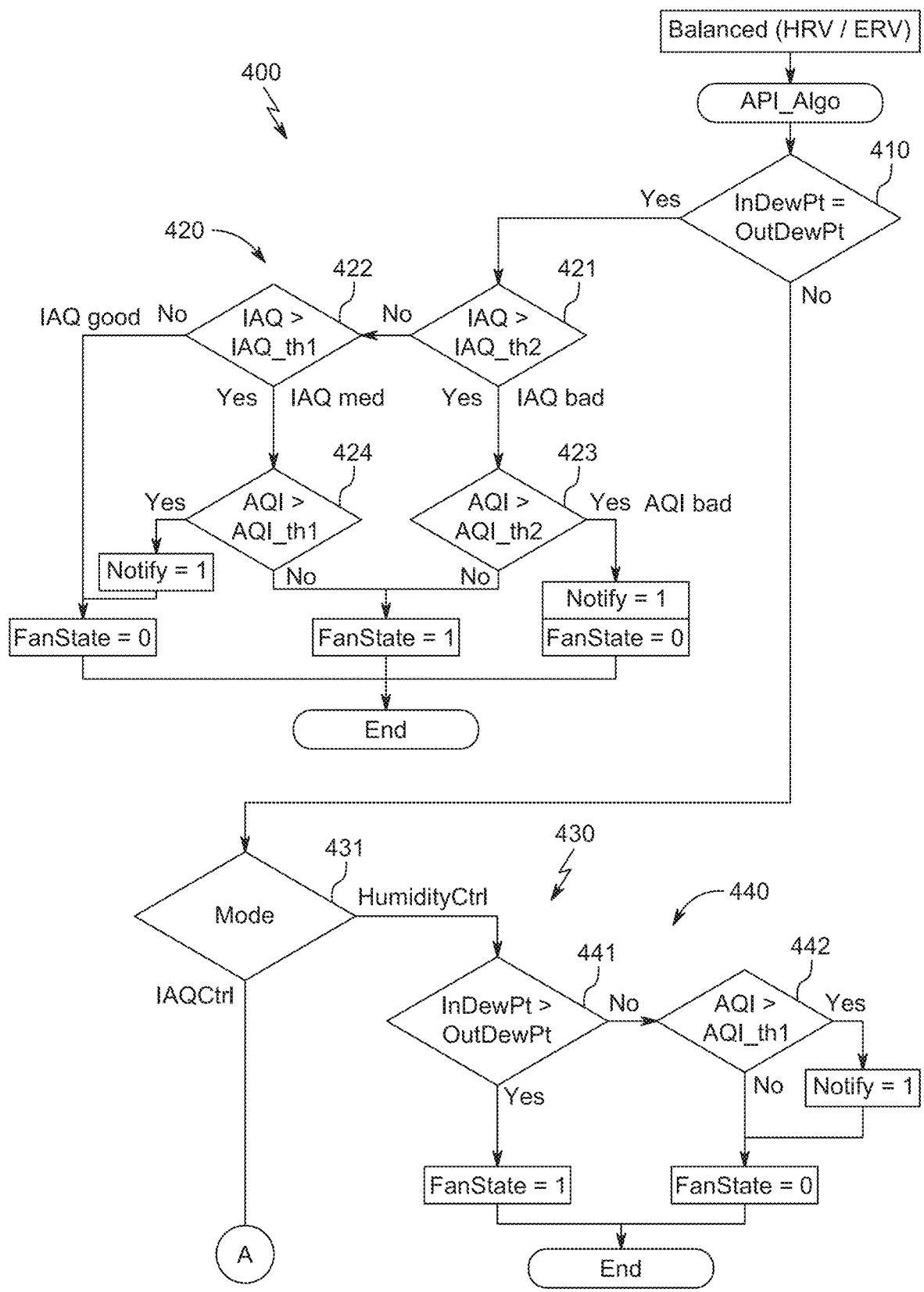
FIG. 4A is a portion of another flow chart describing operation of the indoor air quality system of FIG. 1.
Figure 4B:
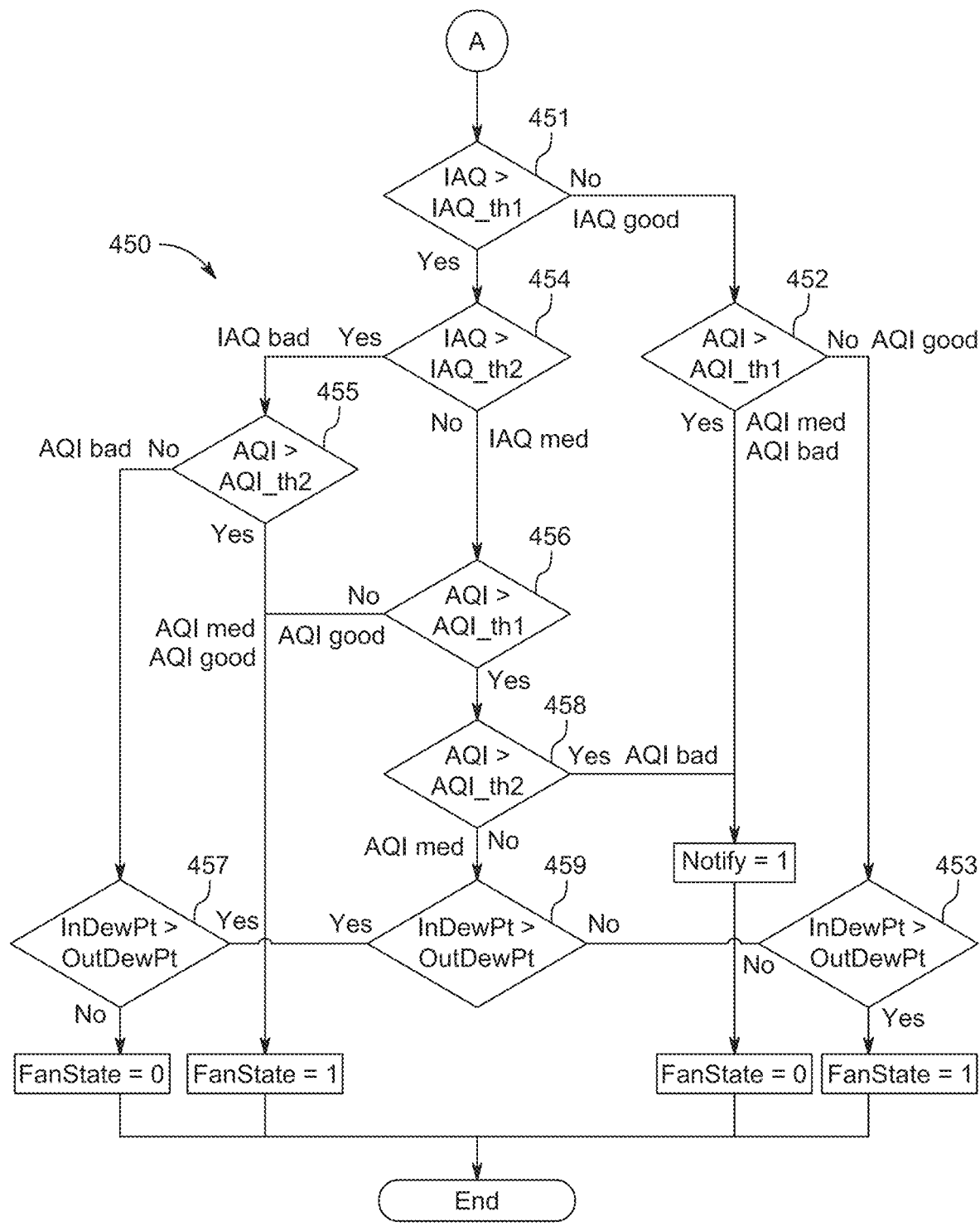
FIG. 4B is another portion of the flow chart of FIG. 4A.

A third schematic flow chart 400 describing the operation of the IAQ system 10 is shown in FIG. 4. In the flow chart of FIG. 4, the IAQ system 10 includes one or more exhaust fans 120/122, a coupled or de-coupled supply fan 124 and the energy/heat recovery device 126. The IAQ system further includes a notification device 114 which may be a fixed panel or user interface in the structure 100 or a mobile device such as s smart-phone, tablet, computer, etc. The notification device 114 is configured to notify a user when certain conditions are present—namely when outdoor AQI data is greater than the first or second AQI data thresholds. This provides the user with a notification that the IAQ system 10 is not operating and a reason for why the IAQ system 10 is not operating. In other embodiments, any alert or message may be output by the IAQ system 10 following an action. For example, the alert may inform the user of a status of the IAQ system 10.

A first step 410 includes determining whether indoor dew point is equal to outdoor dew point levels. This may be assumed or sensed by the monitoring units 102 and by consulting the data source 113. The same good/medium/bad ranges discussed above apply to process 400. The same ranges for better/worse and same apply to process 400.

If indoor dew point levels are equal to outdoor dew point levels, the process 400 proceeds to a first ventilation sub-process 420 where only exhaust and supply fans are operated (fan state=1) to vent the local environment 98 depending on air quality levels of both the local environment and the outdoor environment. If the indoor dew point is not equal to the outdoor dew point, the process 400 proceeds to a second ventilation sub-process 430 which considers user preference and humidity when determining when to operate the fans and/or other devices. At a first step 431, the user may provide an input into the system 10 to indicate a preference for humidity control (sub-process 440) or IAQ control (sub-process 450).

At a first step 421 of sub-process 420, the local database/server 110 determines whether the IAQ data from the monitoring devices 102 is greater than a second IAQ threshold (i.e. a bad IAQ). If the IAQ data from the monitoring devices 102 is not greater than the second IAQ threshold, the process 420 proceeds to step 422 where the local database/server 110 determines whether the IAQ data from the monitoring devices 102 is greater than a first IAQ threshold (i.e. a medium IAQ). If the IAQ data from the monitoring devices 102 is greater than the second IAQ threshold, the sub-process 420 proceeds to a step 423 where the local database/server 110 determines whether the AQI data is greater than the second AQI threshold.

At step 422, if the IAQ data from the monitoring devices 102 is not greater than the first IAQ threshold, the exhaust and supply fans are not operated (i.e. fan state=0). If the IAQ data from the monitoring devices 102 is greater than the first IAQ threshold, the sub-process 420 proceeds to a step 424 where the local database/server 110 determines if the AQI data is greater than the first AQI threshold. If the AQI data is greater than the first AQI threshold, the exhaust and supply fans are not operated and the notification is output by the local database/server 110 and displayed on the notification device 114. If the AQI data is not greater than the first AQI threshold, the exhaust and supply fans are operated.

At step 423, if the outdoor AQI data is greater than the second AQI threshold, the exhaust and supply fans are not operated and the notification is output by the local database/server 110 and displayed on the notification device 114. If the outdoor AQI data is not greater than the second AQI threshold, the exhaust and supply fans are operated.

Sub-process 440 includes a decision step 441 where the database/server 110 determines whether the indoor dew point is greater than the outdoor dew point. If the indoor dew point is greater than the outdoor dew point, the exhaust and supply fans are operated to ventilate the local environment 98 to exchange the less humid outdoor air with the more humid indoor air. The dehumidification device 128 may also be operated to remove moisture from the indoor air. If the indoor dew point is not greater than the outdoor dew point, the sub-process proceeds to a step 442 where the local database/server 110 determines if outdoor AQI data is greater than the first AQI threshold. If the outdoor AQI data is greater than the first AQI threshold the exhaust and supply fans are not operated and the notification is output by the local database/server 110 and displayed on the notification device 114. If the outdoor AQI data is not greater than the first AQI threshold the exhaust and supply fans are not operated and no notification is output by the local database/server 110 or displayed on the notification device 114.

Sub-process 450 includes a step 451 where the local database/server 110 determines whether the IAQ data from the monitoring devices 102 is greater than the first IAQ threshold. If the IAQ data from the monitoring devices 102 is not greater than the first IAQ threshold, the sub-process proceeds to a step 452 where the local database/server 110 determines whether the AQI data is greater than a first AQI threshold (i.e. a medium/bad AQI value). If the AQI data is greater than the first AQI threshold, the exhaust and supply fans are not operated and the notification is output by the local database/server 110 and displayed on the notification device 114. If the AQI data is not greater than the first AQI threshold, the sub-process proceeds to a step 453 where the local database/server determines whether indoor dew point is greater than outdoor dew point. If indoor dew point is greater than outdoor dew point, the exhaust and supply fans are operated. The dehumidification device 128 may also be operated if indoor dew point is greater than outdoor dew point. If indoor dew point is not greater than outdoor dew point, the exhaust and supply fans may not be operated.

If the IAQ data from the monitoring devices 102 is greater than the first IAQ threshold, the sub-process proceeds to a step 454 where the local database/server 110 determines whether the IAQ data from the monitoring devices 102 is greater than the second IAQ threshold. If the IAQ data from the monitoring devices 102 is greater than the second IAQ threshold, the sub-process 450 proceeds to step 455 where the local database/server 110 determines whether the AQI data is greater than the second AQI threshold. If the IAQ data from the monitoring devices 102 is not greater than the second IAQ threshold, the sub-process 450 proceeds to step 456 where the local database/server 110 determines whether the AQI data is greater than the first AQI threshold.

From step 455, if the AQI data is greater than the second AQI threshold, the exhaust and supply fans are operated. If the AQI data is not greater than the second AQI threshold, the sub-process 450 proceeds to step 457 where the local database/server 110 determines whether indoor dew point is greater than outdoor dew point. If indoor dew point is greater than outdoor dew point, the exhaust and supply fans are operated. If indoor dew point is not greater than outdoor dew point, the exhaust and supply fans are not operated.

From step 456, if the AQI data is not greater than the first AQI threshold, the exhaust and supply fans are operated. If the AQI data is greater than the first AQI threshold, the sub-process 450 proceeds to a step 458 where the local database/server 110 determines whether the AQI data is greater than the second AQI threshold. If the AQI data is greater than the second AQI threshold, the exhaust and supply fans are not operated and the notification is output by the local database/server 110 and displayed on the notification device 114. If the AQI data is not greater than the second AQI threshold, the sub-process 450 proceeds to step 459 where the local database/server 110 determines whether indoor dew point is greater than outdoor dew point. If indoor dew point is greater than outdoor dew point, the exhaust and supply fans are operated. If indoor dew point is not greater than outdoor dew point, the exhaust and supply fans may not be operated.

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. In alternative implementations, hard-wired circuitry may be used in place of or in combination with software instructions to implement various implementations of the present disclosure. Thus, implementations of the present disclosure are not limited to any specific combination of hardware circuitry and software.

Issues related to indoor air quality may be exasperated by outdoor air quality. Forest fires, smog, pollen and other external factors can all affect outdoor air quality. The IAQ system includes a database of ongoing outdoor air quality data including but not limited to weather, particulates, outdoor temperature, and outdoor humidity. The present disclosure integrates an outdoor weather API so that the system can make better ventilation decisions based upon both indoor as well as outdoor conditions in combination. Outdoor Air Quality Index (AQI) information may be displayed in on a user interface. References to outdoor AQI health issues including but not limited to irritated eyes, coughing, as well as risks to health may also be displayed on the user interface.

A user of the IAQ system may input their home zip code during initial setting up of the IAQ. This input may be used when accessing the weather API to define the nearest weather station and associated AQI data. The user may also have the option of selecting an alternate available weather station from the API within their zip code. The IAQ system may have a default selection for humidity or outdoor AQI based upon zip code/climate zone.

The AQI or elements thereof could be used to forecast/predict future events and used in the system algorithm. For example, if high PM2.5 is forecasted for the upcoming day from the weather API, the system algorithm may call for a longer ventilation period ahead of the predicted problematic forecast. The overall AQI score (numeric value of several constituents (CO, NO2, O3, PM2.5, PM10, NO2, SO2) and outdoor humidity/temperature may be used to simplify the algorithm. In other embodiments, one or more individual outdoor AQI constituents may be utilized independently instead of the overall AQI score to further improve the precision of the system algorithm. Operation of the IAQ system 10 may consider energy costs, in some embodiments.

While the present disclosure describes various exemplary embodiments, the disclosure is not so limited. To the contrary, the disclosure is intended to cover various modifications, uses, adaptations, and equivalent arrangements based on the principles disclosed. Further, this disclosure is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims.

The invention claimed is:

1. A system configured to dehumidify air within a local environment of a structure, the system comprising:
   a plurality of monitoring devices configured to be located in the local environment of the structure comprised of one or more rooms of the structure, each monitoring device of the plurality of monitoring devices configured to be located in one of the one or more rooms,
   a processor configured to:
   determine a room humidity level for each of the one or more rooms with the monitoring device located in the corresponding one of the one or more rooms,
   assign a weight to the room humidity level determined for each of the one or more rooms where high-humidity events take place,
   calculate a total humidity level of the local environment based on the room humidity levels of each of the one or more rooms, wherein the calculating of the total humidity level includes averaging the weighted room humidity level in the local environment, and
   activate a dehumidification device to remove moisture from the air within at least some of the one or more rooms when (i) the total humidity level is above a predetermined threshold, and (ii) it is determined there are no localized, high humidity events in the local environment.

2. The system of claim 1, wherein the processor is further configured to activate a local exhaust fan in communication with the second room to remove moisture from the second room.

3. The system of claim 1, wherein the processor is configured to weight the room humidity level determined for each of the one or more rooms where high-humidity events take place according to manually entered user preferences to adjust the weighting of the room humidity level determined for each of the one or more rooms.

4. The system of claim 1, wherein the processor is configured to determine that a high-humidity event has occurred in a first room of the structure and adjust the room humidity value of the first room prior to calculating the total humidity level of the local environment.

5. The system of claim 1, wherein the processor is configured to obtain outdoor air quality index data and activate the dehumidification device to adjust at least one room humidity value based, at least in part, on the outdoor air quality index data.

6. The system of claim 1, wherein the processor is configured to obtain an outdoor dew point and an indoor dew point and if the outdoor dew point is greater than the indoor dew point, and the indoor dew point is greater than a predetermined threshold, the processor is configured to activate an exhaust fan and a supply fan together with the dehumidification device to remove indoor pollutants and decrease humidity within the indoor environment at the same time.

7. A system configured to reduce humidity levels within a local environment of a structure, the system comprising:
   a plurality of monitoring devices configured to be located in the local environment of the structure comprised of one or more rooms of the structure, each monitoring device of the plurality of monitoring devices configured to be located in one of the one or more rooms,
   a processor configured to:
   determine a room humidity level for each of the one or more rooms with the monitoring device located in the corresponding one of the one or more rooms,
   calculate a total humidity level of the local environment based on the room humidity level of each of the one or more rooms, and calculate an indoor dew point from the total humidity level,
   obtain an outdoor dew point,
   determine whether to activate a dehumidification device to remove moisture from the air within one or more of the one or more rooms based on the total humidity level, unless the outdoor dew point is within 10% of the indoor dew point, and
   determine to activate an exhaust fan and a supply fan together with the dehumidification device (i) if the outdoor dew point is greater than the indoor dew point and (ii) the indoor dew point is greater than a predetermined threshold, to remove indoor pollutants and decrease humidity within the indoor environment at the same time.

8. The system of claim 7, wherein the processor is further configured to weight the room humidity level determined for each of the one or more rooms.

9. The system of claim 8, wherein weighting the room humidity level includes determining that a first room of the local environment has a first humidity level within a range and determining that a second room of the local environment has a second humidity level outside of the range.

10. The system of claim 8, user preferences adjust the weighting of the room humidity level determined for each of the one or more rooms.

11. The system of claim 7, wherein the processor is further configured to determine that a high-humidity event has occurred in a first room of the structure and adjusting the room humidity value of the first room prior to calculating the total humidity level of the local environment.

12. A system configured to improve humidity levels within a local environment of a structure, the system comprising:
a plurality of monitoring devices configured to be located in the local environment of the structure comprised of one or more rooms of the structure, each monitoring device of the plurality of monitoring devices configured to be located in one of the one or more rooms,
a processor configured to:
determine a room humidity level for each of the one or more rooms with the monitoring device located in the corresponding one of the one or more rooms,
calculate a total humidity level of the local environment based on the room humidity level of each of the one or more rooms and calculate an indoor dew point from the total humidity level,
obtain an outdoor dew point,
determine whether to activate a dehumidification device to remove moisture from the air within one or more of the one or more rooms based on the total humidity level, if the indoor dew point is less than the outdoor dew point, and
determine whether to activate an exhaust fan and a supply fan together with the dehumidification device (i) if the outdoor dew point is greater than the indoor dew point and (ii) the indoor dew point is greater than a predetermined threshold, to remove indoor pollutants and decrease humidity within the indoor environment at the same time.

13. A system configured to improve humidity levels within a local environment of a structure, the system comprising:
a plurality of monitoring devices configured to be located in the local environment of the structure comprised of one or more rooms of the structure, each monitoring device of the plurality of monitoring devices configured to be located in one of the one or more rooms,
a processor configured to:
determine a room humidity level for each of the one or more rooms with the monitoring device located in the corresponding one of the one or more rooms,
assign a weight to the room humidity level determined for each of the one or more rooms,
determine whether to activate a local exhaust fan in communication with a second room of the local environment to remove moisture from the second room when (i) a first room of the local environment has a first humidity level within a range and (ii) the second room has a second humidity level outside of the range,
calculate a total humidity level of the local environment based on the room humidity levels of each of the one or more rooms, wherein calculating the total humidity level includes averaging the weighted room humidity level in the local environment, and
determine whether to activate a dehumidification device to remove moisture from the air within one or more of the one or more rooms based on the total humidity level, and activating the dehumidification device only when the total humidity level is above the predetermined threshold and it is determined that there are no localized, high humidity events in the local environment.

* * * * *